Jan. 28, 1941.　　　P. P. CRISP ET AL　　　2,229,885

METHOD OF MAKING RUBBER FENDERS

Original Filed July 13, 1935　　2 Sheets-Sheet 1

Inventors
PARK P. CRISP
WILLIAM E. HAGGAN

BY Ely & Frye
Attorneys

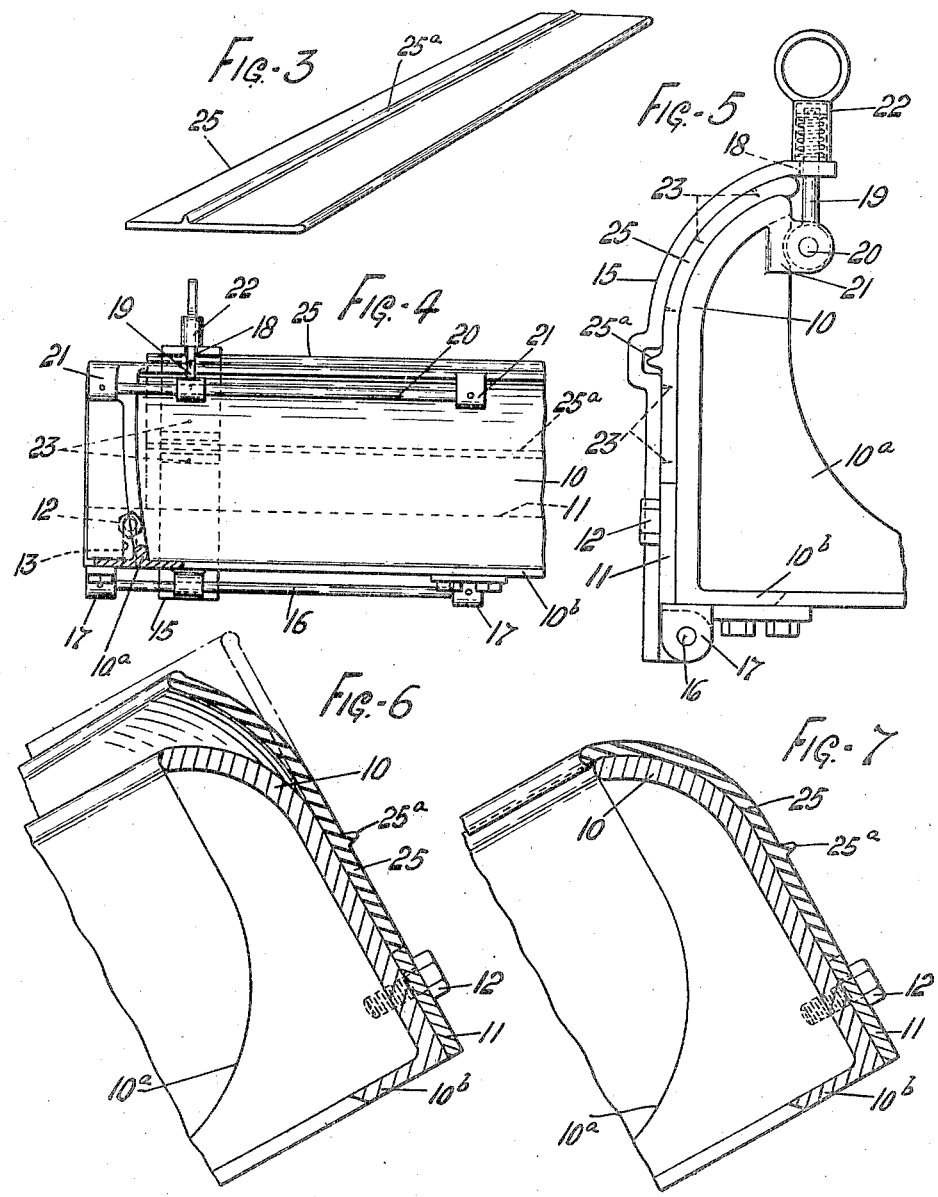

Patented Jan. 28, 1941

2,229,885

UNITED STATES PATENT OFFICE 2,229,885

METHOD OF MAKING RUBBER FENDERS

Park P. Crisp, Stow, and William E. Haggan, Akron, Ohio, assignors to The Firestone Tire & Rubber Company, Akron, Ohio, a corporation of Ohio Original application July 13, 1935, Serial No. 31,220. Divided and this application February 21, 1938, Serial No. 191,592

6 Claims. (Cl. 18—56)

This invention relates to methods of manufacturing rubber goods that are generally of strip form and have longitudinal and transverse curvature, and more especially it relates to improved procedure for the manufacture of rubber fenders for motor vehicles.

The chief object of the invention is to provide an improved method for the expeditious vulcanization of rubber fenders for motor cars. More specifically the invention aims to effect the vulcanization of articles of the character mentioned in open heat, without the use of molds. Economies of time, labor, and equipment also are contemplated. Other objects will be manifest.

This application is a division of our prior United States Patent No. 2,132,819, issued October 11, 1938.

Of the accompanying drawings:

Figure 3 is a perspective view of a work-unit as it appears before being mounted upon a vulcanizing form;

Figure 4 is a section on the line 4—4 of Figure 2;

Figure 5 is an end view of the structure shown in Figure 4, on a larger scale, as viewed from the left thereof;

Figure 6 is a transverse section through the medial region of a vulcanizing form, and the work thereon, as they appear when in position for vulcanization, but before vulcanization begins; and Figure 7 is a view similar to Figure 6 showing the work as it appears at the completion of the vulcanizing operation.

Figure 2:
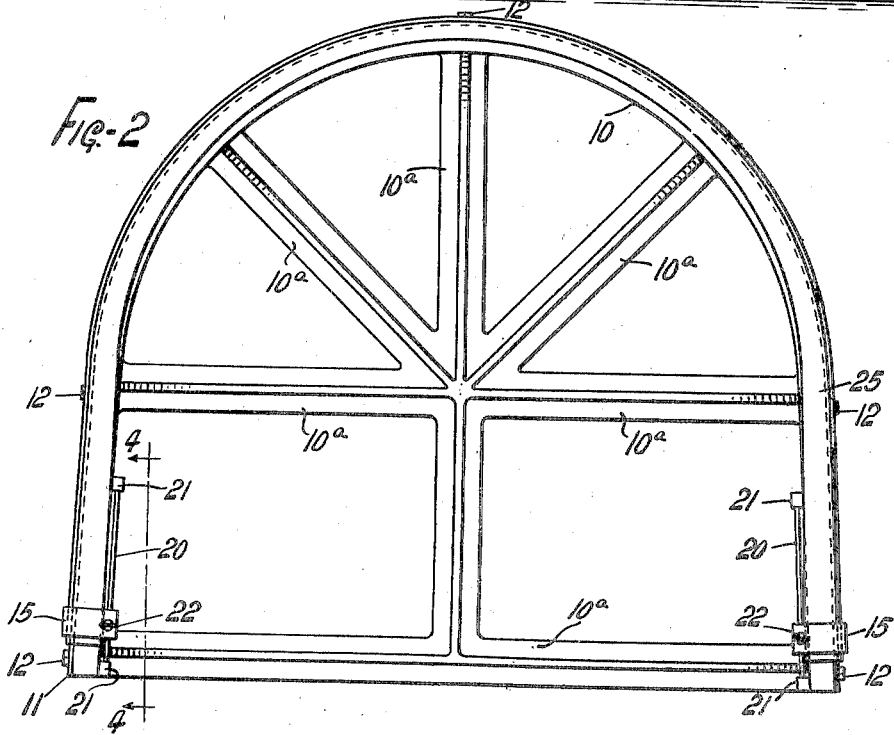
Figure 2 is a plan view of one of the forms upon which a work-unit is mounted during vulcanization, and the work thereon.

Referring to the drawings, 10 designates a form or work support upon which the work is secured and supported during vulcanization. Said work-supporting form comprises a longitudinally arcuate structure upon the outer peripheral face of which the work may be mounted, said arcuate structure also being transversely arcuate in a region of substanial width along one lateral margin thereof. A removable, arcuate, longitudinally extending gauge plate 11 is secured to the work-supporting face of structure 10, by means of cap screws 12, along the margin thereof that is opposite said transversely arcuate margin, said plate constituting a guide against which a margin of the work abuts for properly positioning the latter on the support. The cap screws 12 extend through respective slots 13 that are disposed transversely in the gauge plate, the arrangement being such that said gauge plate may be adjusted laterally to accommodate the work support to work of various widths. As shown in Figure 2, the structure 10 describes an arc of substantially 180° and has slightly diverging extensions at its respective ends. It is laterally reinforced by a plurality of integral radial and transverse ribs 10ª, 10ª.

Work mounted upon the support 10 is secured thereto at its respective end portions, and to this end arcuate clamps 15 are positioned at the extensions at the respective ends of the arcuate structure 10. Each clamp is pivotally mounted at one of its ends upon a rod 16 that is supported between a pair of brackets 17, 17 that are secured to a flange 10ᵇ that extends inwardly from that margin of the structure upon which gauge plate 11 is mounted. The clamp is constructed and arranged to transverse the work-supporting surface of the support, and has its free end slotted at 18, Figures 5 and 4, to receive a latch-bolt 19 that is pivotally mounted upon a rod 20 that is supported between two brackets 21, 21. The latter are formed integral with the structure 10 on the inner periphery of the transversely arcuate marginal portion thereof. A spring-pressed keeper 22 is mounted on the free end of the latch-bolt and is adapted to engage with the clamp to retain the latch-bolt within the slot 18 therein. The clamps 15 and latch-bolts 19 are slidable longitudinally of their respective pivot rods 16 and 20 to the end that said clamps and latch-bolts may be positioned at different points so as to accommodate work of various lengths. Each clamp 15 has a longitudinal series of pins 23, 23 projecting from its concave face for the purpose of impaling the end portions of the work and holding the latter firmly to the support.

The work, designated 25, is shown in its initial form in Figure 3. It consists of an elongate strip or slab of unvulcanized rubber composition that may be formed in a continuous length, as by an extruding machine, and thereafter cut into individual units of the desired length. As shown, the work-unit is formed with one square longitudinal margin and one rounded or beaded longitudinal margin, and a longitudinally extending rib 25a on one face thereof, but it will be understood that these characteristics of the work may be varied without in any way affecting the invention.

Vulcanization of the work is effected in open heat in a horizontal vulcanizer (not shown) of usual construction while the supporting form 10 with the work thereon is disposed in determinate angular or inclined position with relation to the horizontal. To this end a carriage 27 is provided, which carriage carries a plurality of supporting frames 28, 28 that support respective forms 10 at an angle of 30°–35° to the horizontal, the medial, arcuate portion of each form being uppermost. This arrangement of the forms 10 is an important feature in effecting the vulcanization of the work, and it also permits an overlapping arrangement of the forms whereby economy of space is obtained. The carriage 27 may be provided with flanged wheels 29, 29 to permit it readily to be moved into and out of a vulcanizer that is provided with suitable track-rails, and a wheeled truck 30 may be provided for conveying the carriage 27 to and from the vulcanizer.

The method of practising the invention with the previously described apparatus is as follows: An unvulcanized work-unit 25 is placed upon a supporting form 10 with its square margin abutting the edge of gauge-plate 11, assuming the position shown in broken lines in Figure 6. The work-unit is then stretched longitudinally about the form, each way from its middle, and its end portions secured in place by means of the respective clamps 15. The stretching of the work-unit elongates it about three inches at each end, and places the entire unit under longitudinal tension, with the result that the unsupported marginal portion of the unit, about the transversely arcuate marginal portion of the form, is constricted and drawn toward said arcuate portion of the form as is clearly shown in full lines in Figure 6.

Figure 1:
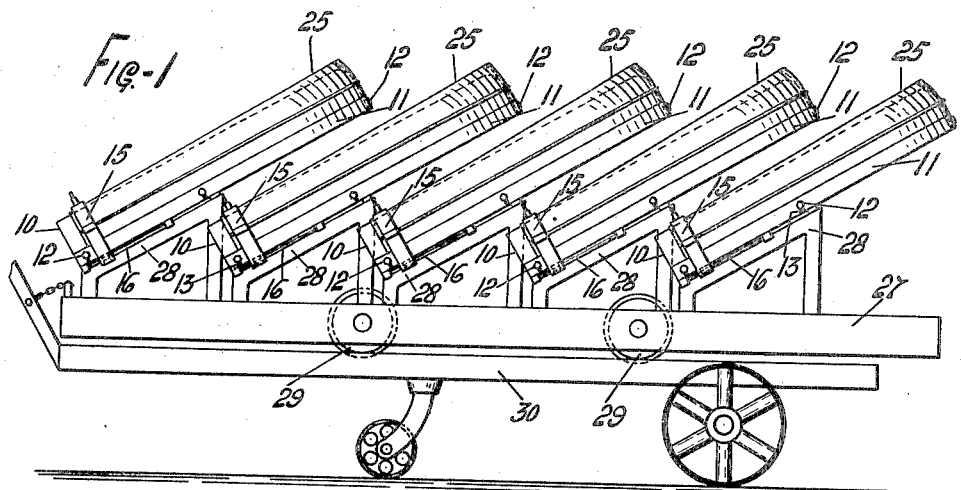
Figure 1 is a side elevation of a complete apparatus for use in concurrently vulcanizing a plurality of rubber fenders.

The form 10 with the work 25 thereon is then mounted upon the carriage 27, in the inclined position shown in Figure 1, and the latter moved into a vulcanizer where the work is subjected to open, vulcanizing heat. During the initial phase of the vulcanizing operation, the rubber composition of the work softens, and, because of the force of gravity and the tension previously imparted to the work, the unsupported marginal portion of the latter is drawn inwardly until it rests upon the transversely arcuate portion of the form, as shown in Figure 7. In this position of the work the vulcanization thereof is completed so that it is permanently shaped in conformity with the longitudinal and transverse curvature of the form. After vulcanization the work is removed from the form, washed, and its ends trimmed to give it proper length.

The improved method is practised with the relatively simple apparatus described, and the invention achieves the other objects set forth in the foregoing statement of objects. The work requires but little treatment after vulcanization to make it ready for use, and there are no overflow rands to be removed as is the case with articles vulcanized in cavity molds.

Modification may be resorted to without departing from the spirit of the invention or the scope of the appended claims which are not limited wholly to the specific construction shown or exact procedure described.

What is claimed is:

1. The method of making rubber articles which comprises mounting a plastic, unvulcanized article upon an arcuate support that engages a portion of the article exclusive of a marginal portion thereof, applying tension to the article to incline its unsupported portion toward the support, and thereafter vulcanizing the article in open heat whereby the tension in the article urges the unsupported portion of the article toward said support as the rubber softens.

2. The method of making rubber articles which comprises mounting a plastic, unvulcanized article upon an arcuate support that engages a portion of the article exclusive of a marginal portion thereof, applying tension to the article to incline its unsupported portion toward the support, and then vulcanizing the article in open heat while it is so positioned that gravity and the tension in the article draw the unsupported portion thereof against said support.

3. The method of making rubber articles which comprises placing the article while in plastic, unvulcanized condition under tension and positioning the same on a form with a marginal portion thereof in overhanging relation to the form, and then subjecting the article to vulcanizing heat whereby gravity and tension in the article draw the overhanging portion thereof onto the form.

4. A method of making rubber articles which comprises mounting the unvulcanized article upon a support that engages a portion of the article exclusive of a marginal portion thereof, applying tension to the article to urge its unsupported portion part way toward the support, the support being positioned at an angle to the vertical so that the force of gravity tends to urge said unsupported portion still further toward the support, and thereafter vulcanizing the article in open heat, whereby the tension in the article and the force of gravity urge the unsupported portion of the article into engagement with said support as the rubber softens under heat of vulcanization.

5. The method of making a rubber article having a longitudinal curvature and a transverse curvature, from a flat strip of rubber, comprising mounting the unvulcanized strip of rubber about a longitudinally and transversely curved support, bending the rubber about the support to give it longitudinal curvature while permitting a margin of the rubber strip to overhang the transversely curved portion in spaced relation thereto, the support being inclined at an angle to the vertical with the transversely curved portion of the support below the overhanging unsupported marginal portion of the rubber strip, and vulcanizing the article in open heat, whereby the heat of vulcanization softens the rubber permitting the force of gravity to pull the rubber into contact with the transversely curved portion of the support to give the article its transverse curvature.

6. A method of making a rubber fender for a motor vehicle comprising bending a flat strip of unvulcanized rubber about a longitudinally curved form with a projecting marginal edge of the strip overhanging a transversely curved portion of said form in spaced relation thereto, the said form being inclined at an angle to the vertical, and vulcanizing said strip in open heat whereby the force of gravity will urge the overhanging portion of the strip toward said transversely curved portion of said form to make a fender having both longitudinal and transverse curvature.

PARK P. CRISP.
WILLIAM E. HAGGAN.